Figure 1:
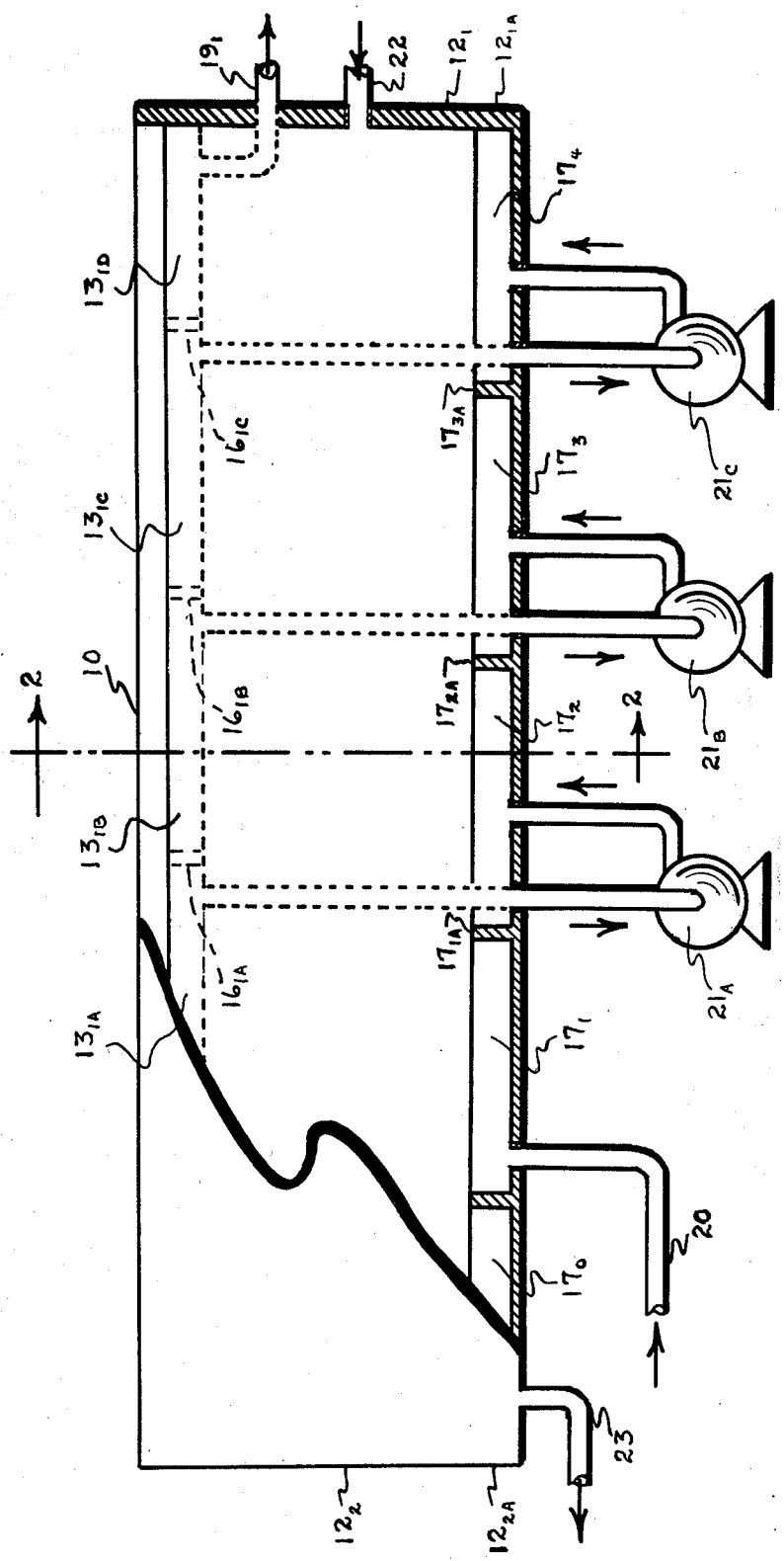

United States Patent [19]

Peck

[11] 4,328,094
[45] May 4, 1982

[54] APPARATUS AND PROCESS FOR THE BENEFICIATION, WASHING, ELUTRIATION AND CLEANING OF PARTICULATE SOLIDS AND RECOVERY OF CHEMICAL VALUES

[76] Inventor: Albert C. Peck, 9770 Highland Rd., Baton Rouge, La. 70810

[21] Appl. No.: 119,961

[22] Filed: Feb. 8, 1980

[51] Int. Cl.³ ............................................... B03B 5/66
[52] U.S. Cl. .................................... 209/160; 209/500; 210/715; 423/658.5
[58] Field of Search ............... 209/155, 158, 160, 459, 209/400, 500, 424, 426, 456, 501, 162; 134/25.1, 25.5; 210/715, 461, 748, 484; 423/41, 131, 658.5, 69, 150; 75/1 M

[56] References Cited

U.S. PATENT DOCUMENTS

| | | | |
|---|---|---|---|
| 170,422 | 11/1875 | Wengler | 209/160 |
| 1,490,420 | 4/1924 | Elder | 209/160 X |
| 2,765,913 | 10/1956 | Weiss | 134/25.5 X |
| 2,790,551 | 4/1937 | Eder | 209/155 |
| 2,811,257 | 10/1957 | Hisle | 209/158 |
| 3,070,228 | 12/1962 | Hollingsworth | 209/160 |
| 4,039,425 | 8/1977 | Neavel | 209/158 |

FOREIGN PATENT DOCUMENTS

| | | | |
|---|---|---|---|
| 199141 | 2/1958 | Austria | 209/158 |
| 713447 | 10/1941 | Fed. Rep. of Germany | 209/158 |

Primary Examiner—Robert Halper
Attorney, Agent, or Firm—Llewellyn A. Proctor

[57] ABSTRACT

Apparatus and process for the beneficiation, or for the continuous hydraulic elutriation of particulate solids. The apparatus is characterized generally as an elongate vessel, with a width of V-shaped cross-section. The upper side of the vessel is provided with launders, or overflow weirs, suitably arranged in series along the two side walls of the vessel. An elongate upwardly faced compartment is provided at the bottom of the vessel by the converging side walls, and preferably it is compartmented. The vessel is provided at one end with a particulate solids inlet, and the opposite end with a particulate solids outlet; and means are provided at the bottom of the vessel for the introduction of liquid. Pumps are employed to withdraw overflow liquid from the launders, and inject same into the vessel bottom compartment, or compartments. The particulate solids, or slurry introduced into the slurry inlet end of the vessel is contacted with an upwardly flowing stream of liquid, the upward rate of which is progressively reduced such that the solids enter into a state of hindered settling. The solids are displaced, and transported in seriatim from one zone, or stage to another, washed, elutriated and discharged at the outlet end of the vessel. Contaminants, or chemicals, or both, and reject size fines are discharged from the vessel with the overflow liquid.

15 Claims, 2 Drawing Figures

APPARATUS AND PROCESS FOR THE BENEFICIATION, WASHING, ELUTRIATION AND CLEANING OF PARTICULATE SOLIDS AND RECOVERY OF CHEMICAL VALUES

It is necessary in many chemical process industries to separate small diameter particulate solids from their mother liquor. In the Bayer process, for example, red muds residues are produced in the treatment of bauxite with hot caustic sodium aluminate solution, and it is necessary to separate these solids from liquor, clean the solids, and recover chemical values from the solids. The separation and cleaning of the solids, which includes iron oxides, sodium aluminum silicate, titanium oxide, and various other oxides, however, is not a simple matter for the particulate solids range from sand to colloid size. Commonly, 90 percent of the solids particles are less than 100 microns average diameter, and many are less than one micron. Three methods are possible for the separation and cleaning of solids, and recovery of chemicals from Bayer process liquors, viz. hydrocyclone centrifugal force separation, filter and counter current decantation. Whereas centrifugal force separation of a relatively coarse solids residue in hydrocyclones is possible, with washing of the solids particles in a mechanical classifier (e.g. an Akins spiral classifier) this method is ineffective because of the very fine solids particles that comprise the bulk of the residue. Filtering, with subsequent washing of the collected residue (e.g. in pressure type leaf filters), is likewise unfeasible because of the high labor and equipment costs. Counter current decantation is commercially practical today in most alumina plants. This method too has many drawbacks.

In counter current decantation the red mud residues from the Bayer process, after sand separation, are treated at temperatures near their atmospheric boiling points in a large number of settling tanks, or vessels, equipped with mechanical rakes to transport the settled mud along the bottoms of the vessels to an outlet, or outlets. Chemical flocculating agents are added to cause the solids particles to flocculate, or coalesce. The mud solids usually constitute from about 5 to 7 wt.% of the slurry feed to a settling vessel, the flocculated residues being retained in the bottoms of the vessels until settling has resulted in solids densification in the bottoms of the vessels. Commonly, the bottoms of the vessels are conical and a single mud slurry outlet is located at the apex of the cone so that the raking is accompanied by gravity assistance. The red mud residues are washed by successive dilutions and concentrations of the mud residues.

Capital costs are quite considerable. Dilution washing of the red mud solids in this manner too is very cumbersome, particularly since the solids particles must be washed and settled with minimum dilution in order to avoid impermissable disturbance of the water balance in the total process. Mud densification, or mud solids concentration, require inordinately large vessel volumes and long slurry residence periods in order to obtain acceptable concentrations of the solids in the bottoms of the vessels. And all too often, a large number of washings are required to recover the valuable chemicals from the solids. And too, the solids particles because of their small size are difficult to clean.

It is, accordingly, the primary objective of the present invention to provide new and novel apparatus and process for the continuous hydraulic elutriation, and washing of particulate solids.

A specific objective is to provide apparatus and process for the treatment and recovery of particulate solids from muds, or slurries, cleaning the solids, and recovering chemical values from the solids.

A further object is to provide apparatus and process of such character which is particularly efficient in recovering and cleaning such solids particles, and economical in terms of capital investment, and operating costs.

Yet another, and more specific object is to provide apparatus and process, as characterized, which is particularly suitable for the washing, elutriation, cleaning and recovery of solids from Bayer process muds, supra, without any requirement for the use of apparatus for desanding such muds prior to treatment, or the use of mechanical raking apparatus, or the use of multiple vessels, mud slurry pumps, flow measurement and flow control devices or the like; and wherein better counter current washing of the solids can be accomplished in a given vessel volume, because there is less loss of dissolved alumina by recrystallization, because shorter residence times are required for separation of solids from the liquor, and the expenditures for chemical flocculants are appreciably reduced because of the elimination of the conventionally used mud pumps and flow control valves.

These and other objects are achieved in accordance with the present invention, embodying apparatus and process, the apparatus embodiment comprising an elongate vessel formed by relatively long enclosing side walls and relatively short enclosing end walls, the cross-section of the vessel, taken in a direction perpendicular to the major axis of the vessel, (i.e. across the width of the vessel) being preferably of substantially V-shape. The upper side, or sides of the vessel are provided with liquid overflow weirs, or launders. Suitably, the overflow weirs, or launders are compartmented and aligned in series one adjacent and contiguous with another. The bottom of the vessel can be formed by physically bringing the two alternately disposed relatively long side walls together in true V-shaped cross-section, or a substantially horizontally oriented floor can be provided. The bottom apex of the vessel or its horizontal floor, includes an aperture, or apertures, along its entire length communicating with a bottom liquid inlet enclosure, which enclosure may be compartmented. In other words, the two side walls can be brought together as a "V", or spaced apart and provided with a horizontal floor and, in either event, provided with a bottom liquid inlet enclosure, which may be compartmented.

In all embodiments, a liquid and solids inlet, either a separate liquid inlet, or inlets, or a common slurry inlet is provided at one end of the vessel for introduction of the liquid and solids, or slurry. This inlet or inlets is located at a position below the launders and above the bottom of the vessel; suitably above the vessel bottom. An outlet, or outlets, for the cleaned solids is provided at the opposite end of the vessel. This outlet may be in an extension of the vessel which is not equipped with a bottom inlet compartment or launders. Liquid overflowing into a launder, launders, or series of launders, is withdrawn therefrom, suitably by the use of pumps, and directly injected into the bottom of the vessel. Suitably, staging is provided by withdrawing liquid from a launder, or from the last launder of a series located relatively close to the clean solids outlet, and the liquid is injected into a portion of the vessel bottom more distantly removed from said clean solids outlet. Preferably, where the bottom liquid inlet enclosure is compartmented, liquid is withdrawn from a launder relatively close to the clean solids outlet, and injected into a bottom liquid inlet compartment more distantly removed from said clean solids outlet, or liquid inlet compartment closer to the liquids and solids, or slurry, inlet at the opposite end of the vessel. In its preferred form, the bottom liquid inlet enclosure is compartmented, launders are located on the two side walls of the vessel, and the launders are equal in number to the vessel bottom compartments. In effect, the net movement of liquid is in one horizontal direction, and solids flow in the opposite horizontal direction. Some liquid, in net effect, is also flowed continuously upwardly prior to removal from the vessel.

In terms of process, particulate solids, or a particulate contaminated solids slurry, is introduced into an end of the vessel and contacted from below with a vigorously agitated, ascending stream of liquid, the solids also being swept upwardly but in net effect at a slower rate than that of the ascending stream of cleaning liquid. The particulate solids, in a state of hindered settling, are countercurrently washed and cleaned of contaminants by the cleaning liquid, contaminants being displaced by the cleansing liquid. In total effect, the cleaning liquid with dissolved contaminants and very finely divided fines solids particles flow upwardly into the launders, with little or no carryover of particulate solids of significant size. In the very bottom of the liquid pool the particulate solids undergo a vigorous scrubbing action, the scrubbing action continuing as the solids rise to a more quiescent zone intermediate the bottom and top surface of the pool of liquid. This solid cleaning action continues as the solids are moved, in net effect, horizontally throughout the length of the vessel, the solids being depleted of contaminants as they progress from the end of the vessel wherein the slurry is introduced, to the clean solids discharge end of the vessel. The contaminated particulate solids are continuously countercurrently contacted by relatively clean portions of liquid to obtain maximum scrubbing effectiveness as the solids are moved from the input end to the clean solids discharge end of the vessel. The compartment of the bottom liquid inlet enclosure nearest the cleaned solids discharge end of the vessel is supplied with wash liquid composed in part of fresh water from an outside source and in part of liquid separated from the cleaned mud in a final mud settling basin, or storage pond. In net effect, the suspended solids flow substantially horizontally at a level intermediate the top level and bottom of the liquid pool after introduction of the slurry, and clean solids are removed from the opposite, or clean solids discharge end of the vessel.

The wash liquid with which the solids are cleaned is introduced at the compartment of the bottom liquid inlet enclosure at the cleaned solids exit end of the vessel, is overflowed into the launder compartment above this inlet compartment, and pumped from this launder compartment into the next bottom inlet enclosure compartment toward the slurry inlet end of the vessel. This wash liquid, with the dissolved chemicals displaced from the suspended solids, is successively taken from one launder section and pumped into the next bottom inlet section toward the slurry inlet end, until the launder section at the slurry inlet end is reached. The liquid overflowing into this end launder compartment contains all of the dissolved chemicals displaced from the solids, and is pumped back to the main process stream for reuse of the chemicals.

The invention, in its several aspects, will be better understood by reference to the following detailed description and to the drawings to which reference is made in the description. Corresponding parts of the apparatus are designated by similar whole numbers in the different figures, and subscripts are used to designate portions of a given component. Letters are also used to indicate similar portions, or plural similar components.

Figure 2:
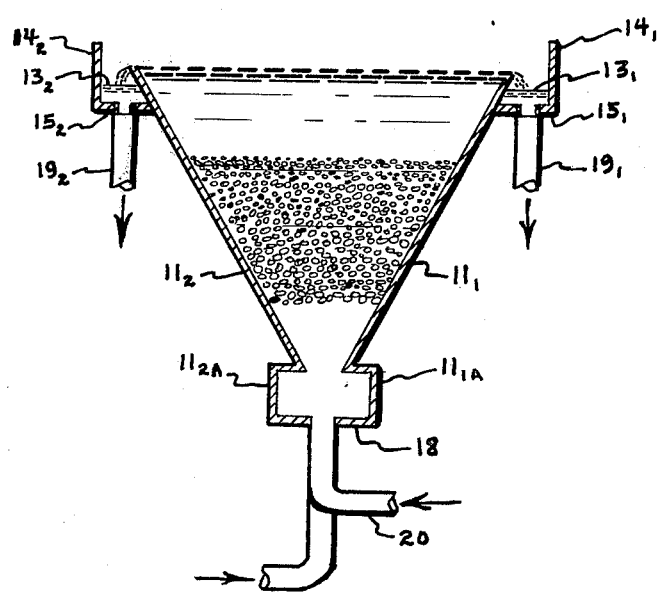

In the drawings:

FIG. 1 depicts an elevation view, in partial section, of a preferred particulate solid elutriation and washing apparatus; and FIG. 2 depicts a cross-section of the apparatus taken along line 2—2 of the preceding figure.

Referring to FIGS. 1 and 2 there is shown an elongate vessel 10 formed by enclosing, relatively long, parallel side walls $11_1$, $11_2$ and relatively short, parallel aligned end wall $12_1$, $12_2$. The vessel 10 is of length several times its width, and of substantially V-shaped cross-section.

The upper edges of said walls $11_1$, $11_2$ are level and may be notched to form a continuous weir, and each side wall is arrayed with a series of launders, $13_{1A}$, $13_{1B}$, $13_{1C}$, $13_{1D}$ and $13_{2A}$, $13_{2B}$, $13_{2C}$, $13_{2D}$, respectively. Each launder $13_1$, $13_2$ of a series is formed by an outer side wall $14_1$, $14_2$ which runs parallel with the top of side walls $11_1$, $11_2$, respectively, and includes a bottom floor $15_1$, $15_2$, respectively. Each launder in a series is separated one from another of a series by end walls $16_{1A}$, $16_{1B}$, $16_{1C}$ and $16_{2A}$, $16_{2B}$, $16_{2C}$, respectively. The outer side wall $14_1$, $14_2$ is higher than the top edge of the side walls $11_1$, $11_2$ of the vessel, respectively, the latter forming a lip over which liquid can flow into a launder. The last launder of a series, i.e. $13_{1D}$, $13_{2D}$, is provided with an overflow $19_1$, $19_2$, for the withdrawal of liquid from the launders.

The bottom of vessel 10 can be arrayed with a series of upwardly opening compartments $17_1$, $17_2$, $17_3$, $17_4$. The compartments $17_1$, $17_2$, $17_3$, $17_4$ are formed by the presence of parallel aligned side walls $11_{1A}$, $11_{2A}$, end walls $12_{1A}$, $12_{2A}$, the bottomwall or floor 18 and intermediate walls $17_{1A}$, $17_{2A}$, $17_{3A}$ which separate compartments $17_1$, $17_2$, $17_3$, $17_4$. In its preferred form, the compartments 17 are equal in number to the number of launders in a series. Preferably, the number of compartments 17 and launders in a series, respectively, range from about 2 to about 15, more preferably from about 4 to about 10. The first of the series of compartments $17_1$ is provided with an inlet 20 for the injection of a wash liquid, and each of compartments $17_2$, $17_3$, $17_4$ are provided with pumps $21_{1A}$, $21_{1B}$, $21_{1C}$ for the withdrawal of liquid from launders $13_{1A}$, $13_{1B}$, $13_{1C}$, and $13_{2A}$, $13_{2B}$, $13_{2C}$, respectively, for pumping into compartments $17_2$, $17_3$, $17_4$, respectively. Thus, wash liquid is injected via line 20 into compartment $17_1$. Wash liquid containing progressively greater amounts of recovered dissolved chemicals is pumped from launders $13_{1A}$, $13_{2A}$ by pump $21_{1A}$ and discharged into compartment $17_2$, from launders $13_{1B}$, $13_{2B}$ by pump $21_{1B}$ and discharged into compartment $17_3$, from launders $13_{1C}$, $13_{2C}$ by pump $21_C$ and discharged into compartment $17_4$, and liquid is removed from launders $13_{1D}$, $13_{2D}$ by lines $19_1$, $19_2$, respectively. Simultaneously, a slurry of particulate solids in liquid is injected into the vessel 10 via line 22, and a mud is taken from the vessel via line 23.

The slurry discharge end of the vessel 10 is optionally extended to provide an additional V-trough $17_0$ which aids in the removal, and discharge of slurry from the vessel. Slurry is removed therefrom via line 23. No fresh liquid is introduced via an inlet into V-trough $17_0$, and no overhead launder is associated therewith.

In net effect then, a solids mixture, mud, or slurry to be elutriated is introduced into vessel 10 via line 22, and simultaneously with its introduction the slurry, or the particulate solids are dispersed, the solids falling while the liquid counter-currently ascends. The particulate solids are in effect suspended in the vertical upflow of liquid in the V-shaped vessel in hindered settling, the solids forming a strata above the vessel bottom compartments 17, and below the launders $13_1$, $13_2$. The geometric shape of the vessel is such that the rate of flow of the liquid decreases as it rises within the vessel so that essentially no particulate solids of larger than a desired separation size are carried over into the launders $13_1$, $13_2$. With the continued introduction of slurry into the vessel 10 via inlet 22 the solids flow as a strata along the length of the vessel 10, and they are discharged via line 23 at the opposite end of the vessel. The solids during their travel are washed, elutriated, and cleaned of impurities, chemicals, or undersired solids fines. Simultaneously, there is a net flow of liquid in the opposite direction through the vessel 10, the liquid being introduced via inlet 20 and discharged via lines $19_1$, $19_2$, the clean liquid introduced into the vessel 10 displacing impurities, or chemicals, as it moves through the vessel 10 to its point of discharge at outlet $19_1$, $19_2$.

In accordance herewith, hindered settling thus refers to the hindrance of the normal settling rate of the solids caused by the upward velocity of flow of the liquid, without regard to solids particle contact; which may also occur. In effect, the coarser particles are suspended near the bottom of the V-shaped trough, or vessel, in a zone of relatively high upward liquid velocity, and the slower settling finer particles are suspended higher up in the trough, or vessel, where the liquid upward velocity is slower. It thus follows that a more flexible and efficient operation can be provided by providing additional, optional means to pump some of the overflow from a launder back into the same inlet section of the same compartment, if desired. This will permit maintaining the necessary upward liquid velocity to suspend the solids even if the wash liquid supply rate is temporarily reduced, or stopped.

The present apparatus, and process, is particularly suitable for the elutriation and washing of solids contaminated with caustic from alumina processing, particularly the red mud residue produced in the Bayer process wherein alumina is extracted from bauxites, or aluminum hydrate ores. Such muds include iron oxides, sodium aluminum silicate, titanium oxide, and various other metal oxide impurities. The muds contain finely divided particulate solids, some particles ranging less than one micron diameter, for which reason these muds are particularly difficult to wash clean. Water, or aqueous medium capable of displacing dissolved caustic contaminant from the red mud residue, constitutes the preferred wash liquid. The following exemplifies the production of a red mud slurry from bauxite, the separation of the red mud from the slurry, and the washing of the recovered red mud residue pursuant to the practice of the present invention.

EXAMPLE 1

The present example is illustrative of a hindered settling displacement washing operation applied to the processing of bauxite in a medium size commercial operation, to wit:

| | |
|---|---|
| Alumina production | 2300 metric tons/day |
| Bauxite usage | 4300 metric tons/day |
| Buaxite quality | |
| Available trihydrate alumina | 50% |
| Reactive silica | 2% |

Bauxite is admixed with caustic sodium aluminate liquor in ratio of 140 grams of dry bauxite per liter of liquor, the liquor used containing 210 grams per liter of caustic (expressed as sodium carbonate) and 73.5 grams per liter of alumina (expressed as aluminum oxide). This mixture is slurried in a ball mill, and the particulate solids reduced to sizes which will pass through a 35 mesh screen (U.S. Standard). The slurry is then heated to 150° C. under pressure, and digestion continued at such conditions for a time sufficient for the soluble alumina and silica in the bauxite to dissolve, and for essentially all of the dissolved silica to react to form solid sodium aluminum silicate. After the digestion is completed, it is found that the alumina content in the slurry of insoluble residues suspended in the strong sodium aluminate liquor is increased to about 136.5 grams per liter. The mud slurry, which contains red mud solids residue in the amount of about 6 wt.%, is cooled to its atmospheric boiling point, i.e. about 105° C. (220° F.), by reducing pressure and releasing steam in incremental steps.

| | |
|---|---|
| Density of liquor | 1.4 grams/ml. |
| % Solids in slurry | 6 wt. % |
| | (ranges 5 wt. % to 7.5 wt. %) |
| Temperature, °C. | 105 |

This mud slurry, produced by the digestion, without desanding is separated into a relatively particulate free sodium aluminate liquor and relatively soluble chemicals free mud by treatment in a vessel of V-shaped cross section, wide at its top and narrow at the bottom, the side walls converging and essentially meeting at the bottom of the vessel. Liquid inlet apertures are provided in the bottom of the vessel for the introduction of wash liquid, and a series of launders are provided at the top of the vessel along each of its two sides to collect overflowing wash liquor. An inlet is provided at one end of the vessel for the introduction of the mud, or slurry, and an outlet for the washed solids is provided at the opposite end of the vessel. A fresh water inlet is provided in the bottom of the vessel at the washed solids discharge outlet, and a liquids discharge outlet is provided in the launders at the opposite end of the vessel.

To aid in the separation, a commercially available chemical flocculent is first added to the mud slurry, and the mud slurry is then introduced into the vessel via the slurry inlet at an end of the vessel. Sufficient of the flocculent is added to produce flocs which settle at a velocity of 5 to 10 feet per hour, since the very finely divided of the solids mud particles (<35 mesh size) will not settle out on their own in any practical time period. Sufficient of the chemical flocculent causes the finely divided solids particles to settle out leaving a clear supernatent liquor containing less than 100 milligrams/liter, generally less than 50 milligrams/liter of suspended fine solids particles.

On injection of the chemical flocculent treated mud slurry into the vessel, the slurry is contacted with wash water consisting of the water decanted from the second to last launder of the series, or launder adjacent that wherein the final wash water is withdrawn from the vessel. The wash water is introduced into the bottom inlet at the slurry entry end of the vessel. Under the conditions of operation essentially no solids particulates are carried into the launders, and the velocity of flow of the ascending liquid diminishes upwardly to a minimum of on the order of two feet per hour, and not more than 5 feet per hour.

Counter-current displacement washing of the solids particles is continued throughout the length of the vessel by collecting overflow liquid from each launder of the series and pumping this into the bottom of the vessel at a location nearer the point where the mud, or slurry is introduced. At the end of the vessel where the clean mud is discharged, the solids are contacted with relatively pure water, suitably a clear liquid decanted from the surface of a mud lake to which the clean solids are fed, and fresh makeup water.

Calculations indicate that with 10% solids mud slurry in the washing section, as expected as a minimum value, and allowing for only 85% effective displacement, each compartment section will be as effective as one stage of conventional dilution washing at 85% efficiency and with 25% solids achieved in each stage.

The strong sodium aluminate liquor introduced with the mud at the slurry inlet end of the trough is displaced by the wash liquor introduced at the bottom of that section of the vessel, and is diluted due to the fresh makeup water added at the opposite end of the vessel.

In a typical operation, the mud, or slurry exiting from the vessel is flowed into a settling section from which the slurry, at about 10% solids, is removed and pumped to a disposal mud lake. The fresh water added for dilution is added to the slurry introduced into the lake. This fresh water, which also make up for the liquor trapped in the mud left permanently in the lake, will normally range to about twice the weight of the dry mud, but may vary from 1.5 to 4 times the mud weight. The mud left in the lake eventually settles to about 50% solids, and the liquor released is pumped back to the bottom of the vessel. The concentration of soluble sodium aluminate and caustic in this dilute liquor may be controlled by the design of the mud washing equipment and by selection of the amount of fresh makeup water to be used. In accordance with this example, these factors are chosen to result in dilute wash liquor containing about 10 grams per liter total alkali (expressed as $Na_2CO_3$) and about 5 grams per liter of dissolved alumina (expressed as $Al_2O_3$). The chemical values lost with the mud in the mud lake would then amount to 15 tons per day of alkali and 7.4 tons per day of alumina.

In the examples immediately following, the efficiency and utility of the apparatus and process of this invention is illustrated by the beneficiation of bauxite ore by washing to remove clay. In conventional operations the fine clay particles are generally removed from the ore by washing with water in revolving screens, or trommels, or by the use of mechanical vibrating screens. Fine bauxite particles particularly those ranging about 20 mesh and smaller, passing through such screens are then recovered, conventionally, by use of a hydraulic cyclone, or gravity redimentation step, which is not very efficient.

EXAMPLE 2

Similar apparatus is employed in this example as in the preceding example, coarsely crushed bauxite ore being introduced as feed into the solids, or slurry inlet to the vessel, the solids particles being suspended in wash water introduced into, and rising from the bottom of the vessel. The relatively coarse bauxite particles are tumbled in the relatively high velocity stream near the bottom of the vessel, and the adhering clay particles are loosened and detached from the bauxite particles because of turbulence. The fine clay particles ascend, and are then carried over the top walls of the vessel, the agitated bauxite particles are gradually displaced toward the opposite end of the vessel and washing is continued until the solids are discharged. The fine clay particles are carried into the launders by the wash water, and hence are separated from the bauxite. The effectiveness of the separation is found to compare favorably with that produced by screen washing, but is superior thereto because in screen washing only the coarser particles retained on the screen are subjected to prolonged washing and progressively smaller screen must be employed to extend the wash time of the finer bauxite particles. The process of this invention proves particularly effective, and superior to screening where the bauxite ore contains large proportions of bauxite ore smaller than 20 mesh.

It is apparent that various modifications and changes can be made without departing the spirit and scope of the invention. It is, e.g., essential that the cross-section of the vessel be of substantially V-shape throughout its length, and that on approaching the top of the vessel the gradient progressively widen such as to cause decrease of the upward velocity of liquids introduced therein, at least sufficiently to produce suspension of the solids that are to be retained in the vessel for beneficiation and recovery of coarse solids; or for the elutriation and working in a state of hindered settling, until the cleaned solids are displaced, and discharged at the opposite end of the vessel. Too, it is desirable that the vessel be of considerably greater length than the width of the vessel to permit adequate wash time. The absolute width and height, or relative dimensions of the vessel, however, are not critical and can vary with the type of solids which are to be elutriated, washed, and cleaned; and with regard to the efficiency desired for recovery of the chemical values.

The number of stages of displacement washing can be determined by the efficiency of a given stage. The number of stages required for dilution washing and displacement washing, at about 85% efficiency per stage, are about equal. The effectiveness of displacement washing can readily provide about 85% to 90% efficiency. Accordingly, the preferred number of vessel bottom compartments, and launders, are subject to some variation, and determinable by the type, and degree of washing desired.

Having described the invention, what is claimed is:
1. Apparatus for the benefication of solids particles, and for the elutriation and washing of small particulate solids, slurried within a liquid which comprises
   an elongate vessel formed by enclosing side walls and end walls, for containing a liquid, or slurry of the liquid and solids, the cross-section of the vessel, taken in a direction perpendicular to its major axis, being wide at the top and narrow near the bottom of the vessel, the interior of which is of uniform cross-section and unrestricted from end to end, a launder arrayed along the top of the outer side wall of the vessel, the launder being closed by end walls, and having an outer side wall disposed along the length of said side wall of the vessel, the side wall of the launder being connected to the outer side wall of the vessel via a launder bottom wall, the top edge of the side wall of the vessel forming a lip over which a liquid can flow into the launder, an upwardly opening compartment lying at the bottom, and along the length of vessel, formed by the walls of the vessel, liquid and solid inlet means located at one end of said vessel, at a height above the upwardly faced compartment at the bottom of said vessel, and below said launder, liquid and solid outlet means located at the opposite end of said vessel, and below said launder, liquid inlet means for injecting clean liquid into the vessel bottom compartment near the end of the vessel wherein said liquid and solid outlet means is located, means for the withdrawal of liquid from the launder at a location near the end of the vessel which contains the liquid and solids inlet means, and means for withdrawing overflow liquid from the launder, and injecting said overflow liquid into said bottom compartment at a point intermediate the point of injection of the clean liquid and point of withdrawal of the liquid from the vessel.

2. The apparatus of claim 1 wherein the cross section of the elongate vessel, taken in a direction perpendicular to its major axis, is substantially V-shaped.

3. The apparatus of claim 1 wherein the vessel is provided with a plurality of launders, at least one each of which is located on alternate sides along the top side walls of the vessel.

4. The apparatus of claim 1 wherein a plurality of serially aligned launders are provided along a top wall of the vessel.

5. The apparatus of claim 1 wherein the launders are serially arrayed along both of the relatively long side walls of the vessel.

6. The apparatus of claim 1 wherein the vessel bottom compartment is subdivided into a series of contiguous vessel bottom compartments.

7. The apparatus of claim 1 wherein the vessel bottom compartment is subdivided into a series of contiguous vessel bottom compartments, and the vessel bottom compartments are equal in number to the number of launders on one side of the vessel.

8. The apparatus of claim 1 wherein the launders on one side of the vessel, and vessel bottom compartments are equal in number, the liquid inlet means and means for withdrawing liquid from the launders and injecting same into the vessel bottom compartments are staged with respect to the launders, so that liquid can be withdrawn from a launder in a downstream position in the series relative to the launder from which liquid is withdrawn, and injected into a vessel bottom compartment in a more upstream position in the series relative to the vessel bottom compartment nearest the liquid and solids inlet means.

9. The apparatus of claim 8 wherein pumps constitute the means for withdrawing liquid from the launders and injecting same into the vessel bottom compartments.

10. A process for washing of small particulate solids of sand to colloid size slurried within a liquid, which comprises:

contacting said small particulate solids in a liquid containing initial zone with an upwardly flowing stream of injected liquid, the rate of flow of said stream of liquid being decreased as it rises within said initial zone, the small solids particles rising after said initial contact, at a decreasing rate to enter into a state of hindered settling at an intermediate depth below the surface of said liquid containing initial zone, while liquid is overflowed from the surface and removed from said initial zone without significant carry over of said small solids particles, and displacing said small particulate solids from said initial zone by additional small particulate solids, the displaced solids moving unobstructed into a contiguous liquid containing subsequent zone while remaining in a hindered state of settling at an intermediate depth below the surface of said liquid containing subsequent zone, contacting said hindered solids of said subsequent zone with an upwardly injected stream of liquid, while liquid is overflowed from the surface and removed from said subsequent zone without significant carryover of said small solids particles, injecting the liquid overflowed from said subsequent zone into the bottom of the liquid containing initial zone as an upwardly flowing liquid stream for contact with said small solids particles introduced into said initial zone, continuing to introduce small particulate solids into said initial zone of the series, while removing small particulate solids from said subsequent zone of the series.

11. The process of claim 10 wherein a series of from about 2 to about 15 zones are provided, and overflow liquid from each subsequent zone is introduced into each zone preceding that from which the overflow liquid is obtained, each zone being determined by its location in the sequence beginning with the zone in which the solids particles are first introduced.

12. The process of claim 11 wherein the process contains from about 4 to about 10 zones.

13. The process of claim 10 wherein the particulate solids introduced into the initial zone is a fines-containing alumina ore.

14. The process of claim 10 wherein the particulate solids are introduced into the initial zone as a slurry, the liquid portion of said slurry containing chemicals dissolved from the solids of said slurry, and the injected liquid contacted therewith is sufficiently dilute to dissolve additional amounts of chemicals from said solids and displace the liquid of the zone which contains higher concentration of the chemicals.

15. The process of claim 10 wherein the particulate solids introduced into the initial zone is a caustic alkali containing red mud, or slurry from an alumina process, the particulate solids thereof are washed, and cleaned of caustic alkali, and the caustic alkali is dissolved within the liquid overflow.

* * * * *